(12) United States Patent
Nie et al.

(10) Patent No.: US 11,996,615 B2
(45) Date of Patent: May 28, 2024

(54) REFLECTOR ANTENNA SYSTEM WITH MOVABLE MIMO MULTIPLE FEEDS AND ADAPTIVE FIELD FOCUSING METHOD FOR WIRELESS COMMUNICATION IN MULTIPATH FADING ENVIRONMENT

(71) Applicant: University of Electronic Science and Technology of China, Chengdu (CN)

(72) Inventors: Zaiping Nie, Chengdu (CN); Yanhui Liu, Chengdu (CN); Xianzheng Zong, Chengdu (CN); Jun Hu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 168 days.

(21) Appl. No.: 17/448,563

(22) Filed: Sep. 23, 2021

(65) Prior Publication Data
US 2022/0247084 A1 Aug. 4, 2022

(30) Foreign Application Priority Data
Jan. 29, 2021 (CN) .......................... 202110127564.1

(51) Int. Cl.
*H01Q 15/16* (2006.01)
*H01Q 3/18* (2006.01)
(Continued)

(52) U.S. Cl.
CPC ............ *H01Q 15/166* (2013.01); *H01Q 3/18* (2013.01); *H01Q 3/2605* (2013.01);
(Continued)

(58) Field of Classification Search
CPC ...... H01Q 15/166; H01Q 3/2605; H01Q 3/18; H01Q 19/17; H01Q 21/28; H01Q 25/007;
(Continued)

(56) References Cited

U.S. PATENT DOCUMENTS

| 2011/0116569 A1* | 5/2011 | Vaughan | H04B 7/04 375/295 |
| 2014/0225788 A1* | 8/2014 | Schulz | H01Q 19/193 343/702 |

(Continued)

FOREIGN PATENT DOCUMENTS

CN 103794884 A 5/2014

*Primary Examiner* — Hoang V Nguyen
*Assistant Examiner* — Yonchan J Kim
(74) *Attorney, Agent, or Firm* — HAUPTMAN HAM, LLP (57) ABSTRACT

This document discloses a reflector antenna system with movable MIMO multiple feeds and adaptive field focusing method for wireless communication in multipath fading environment; the system comprises antenna reflector, multiple feeds, the equal number of the signal receiving channels and signal transmitting channels to the feeds, all the channels are capable to measure and adjust the amplitude and time delay of signals, and the method for amplitude and time delay adjustment of the powered signals. In signal receiving mode the antenna system makes the signal components arrived through unknown multipath superimpose synchronously; in signal transmitting mode, the system let the wave components radiated from different transmitting channels superimpose synchronously, realizing adaptive field focusing at the antenna of the communication target. This antenna system is suitable for point to point wireless communication in wireless propagation environment with multipath fading effect, showing remarkable improvement of SNR of the signals transmitted and received.

17 Claims, 3 Drawing Sheets

(51) Int. Cl.
| | |
|---|---|
| H01Q 3/26 | (2006.01) |
| H01Q 15/14 | (2006.01) |
| H01Q 19/17 | (2006.01) |
| H01Q 21/28 | (2006.01) |
| H01Q 25/00 | (2006.01) |
| H04B 1/00 | (2006.01) |
| H04B 7/0413 | (2017.01) |
| H04B 7/0417 | (2017.01) |
| H04B 7/0456 | (2017.01) |
| H04B 7/06 | (2006.01) |
| H04B 7/08 | (2006.01) |

(52) U.S. Cl.
CPC ............ *H01Q 15/14* (2013.01); *H01Q 19/17* (2013.01); *H01Q 21/28* (2013.01); *H01Q 25/007* (2013.01); *H04B 1/0057* (2013.01); *H04B 7/0413* (2013.01); *H04B 7/0417* (2013.01); *H04B 7/046* (2013.01); *H04B 7/0671* (2013.01); *H04B 7/084* (2013.01)

(58) Field of Classification Search
CPC ............ H01Q 15/14; H01Q 1/36; H01Q 1/50; H01Q 23/00; H04B 1/0057; H04B 7/0417; H04B 7/046; H04B 7/0413; H04B 7/0671; H04B 7/084
See application file for complete search history.

(56) References Cited

U.S. PATENT DOCUMENTS

| | | | |
|---|---|---|---|
| 2017/0311307 A1* | 10/2017 | Negus | H01Q 21/24 |
| 2018/0248269 A1* | 8/2018 | Luo | H01Q 3/2605 |
| 2021/0099276 A1* | 4/2021 | Watson | H04B 15/00 |

* cited by examiner

REFLECTOR ANTENNA SYSTEM WITH MOVABLE MIMO MULTIPLE FEEDS AND ADAPTIVE FIELD FOCUSING METHOD FOR WIRELESS COMMUNICATION IN MULTIPATH FADING ENVIRONMENT

CROSS REFERENCE TO RELATED APPLICATIONS

This application claims priority to Chinese Patent Application No. 2021101275641 filed Jan. 29, 2021, the disclosure of which is herein incorporated by reference in its entirety.

FIELD

Generally, the present disclosure relates to wireless communication. More particularly, the present disclosure relates to antenna system for point to point wireless communication in propagation environment with multipath fading effect.

BACKGROUND

The present inventors have recognized a reflector antenna system with movable multiple-input and multiple-output (MIMO) multiple feeds and corresponding signal process method for point to point wireless communication to overcome the corruption of the communication quality due to the multipath fading effect of the wave propagation environment.

As well known, the reflector antennas (with single feed or with feed array) have been widely applied in wireless communications (wireless relay communication, satellite communication, or Star Link global communication, for examples) because it is easy to realize the large electrical size of the radiation aperture, the narrow main beam and beam scanning, the high beam gain, and the low cost of manufactory. In the above wireless communications, the main beam of the antenna always aligns to the communication target geometrically to obtain efficient wireless connection. However, there is always inhomogeneity of the media in propagation space, such as the atmosphere and ionosphere, leading to the multipath fading effect which results in instability of the wireless signal intensity, and remarkable corruption of the signal to noise ratio (SNR) for wireless communication, particularly for millimeter wave band. The geometrically beam alignment is no longer available, for example, in wireless relay communication when the sun shines on to the wet ground, lake or river on the wave propagation path, because the resulted steam mass make the propagation space inhomogeneous, leading to wave refraction and multipath fading effect. In this case the simple beam alignment is no longer enough for stable wireless connection. In Star Link global communication, the earth-star wireless channel includes the atmospheric layer and most of the ionized layers, forming its remarkable inhomogeneity and multipath fading effect for millimeter wave propagation. Moreover, the inhomogeneity of the wireless channel mentioned above is always random and time-varying, which is very difficult to predict, estimate and model. Therefore, the efficient anti-fading method should be model independent.

To overcome above problem, the MIMO antenna system with electrically large aperture has been generally applied. However, MIMO antenna system with electrically large aperture, including thousands of antenna elements, is difficult for design and very expensive due to very complicated feeding network and circuits for detection and controlling. Obviously, the manufactory cost and the complicated construction of the MIMO antenna system have constrained its performance and application area severely.

On the one hand, reflector antenna is easy to realize electrically large aperture and high gain, but difficult to obtain the capability similar to MIMO multiple antennas to overcome multipath fading. On the other hand, the MIMO antenna system with electrically large aperture is capable of overcoming multipath fading, but very complicated for design and expensive for manufactory.

Facing the above challenge, a lot of effort has been made in recent years. One way for solving this problem is reduction of the cost for MIMO antenna system with electrically large aperture by improving the design and optimizing the manufactory. Unfortunately, it is shown that the reduction of the cost is very limited and far away from the expectation. Clearly, some new ideas are needed to solve the above problem.

SUMMARY

In this disclosure, different from the MIMO antenna system with electrically large aperture mentioned above, a reflector antenna with movable MIMO multiple feeds, as an economic version of the large aperture MIMO antenna system, is proposed for point-to-point wireless communication to adaptively overcome the multipath fading effect resulted from the inhomogeneity of the wave propagation media, where the aperture size of MIMO antenna system is "enlarged" from the aperture of the MIMO multiple feeds to the aperture size of antenna reflector, although the number of the feeds is far less than that of the MIMO antenna system with aperture size same as the reflector. In other words, with much less cost, the multiple antennas of the MIMO antenna system are simplified to the MIMO multiple feeds with the antenna reflector, and the aperture of the MIMO antenna system is enlarged to the aperture of the reflector in this disclosure. Moreover, the signal processing in this disclosure does not use complicated MIMO signal processing based on the modeling of the wireless channel but simply the conjugate between the transmission coefficients of the signals received and to be transmitted, respectively, based on reciprocity theorem of electromagnetic. The reflector antenna with movable MIMO multiple feeds makes the wave components propagated along different paths and arrived finally to the communication target superimpose synchronously to realize the adaptive field focusing at the receiving antenna and improve the transmission quality and SNR. This "adaptive field focusing" means that the method proposed in this disclosure is model independent. In other words, the wave components propagated along different paths and arrived finally to the communication target will be superimposed automatic synchronously, whatever how complicated the random and time-varying wireless channel is. Compared to the MIMO antenna system with electrically large aperture, this reflector antenna system will obtain not only the radiation performance of the antenna aperture as large as the above MIMO antenna system, but also high efficiency of wireless transmission, improving the signal quality under the condition of low cost.

Furthermore, the antenna system proposed in this disclosure is compatible for different operation modes of the reflector antenna, including the fixed beam mode of reflector antenna with a single feed, the scanning beam mode of the reflector antenna with a feed array, similar to that for homogeneous propagation media, and the operation mode of the reflector antenna with movable MIMO multiple feeds for inhomogeneous propagation media with multipath fading effect, provided that the feeding formulation for the feeds is switched to single fixed beam, scanning beam of the phased array, and MIMO mode, respectively.

This disclosure has the following technical advantages and beneficial results.

1. In a wireless transmission environment with unknown, time-varying, and complex multipath, this disclosure presents a design of reflector antenna with movable MIMO multiple feeds as well as a simple amplitude and time delay adjusting method, which enable to focus the space wave components on the antenna of the communication target adaptively without any knowledge about the inhomogeneity of the wave propagation environment, achieving a high efficiency of the wireless transmission for point-to-point communication.

2. The reflector antenna system is compatible for different operation modes of the reflector antennas, including the fixed beam mode of reflector antenna with a single feed, and the scanning beam mode of the reflector antenna with a feed array, all for wireless communication in homogeneous propagation media, besides the mode of the reflector antenna with removable MIMO multiple feeds proposed in the disclosure for wireless communication in inhomogeneous propagation media with multipath fading effect;

Actually, the reflector antenna system in this disclosure can be switched to the fixed beam mode provided simply the feed at the focal point works as the single feed of the reflector antenna. Similarly, the reflector antenna system in this disclosure can be also switched to the scanning beam mode once the multiple feeds of the reflector antenna system are excited, as a phased array, by signals with equal amplitude but time-varied stepped phases, respectively.

3. The new millimeter wave communication antenna proposed in the present disclosure does not have excessively strict requirements on the fabrication accuracy of the reflector antenna in a lot of applications. Actually, for some possible errors of the reflector antenna (such as the processing error of the reflector profile, the gravity deformation error, the assembly error of the feed position, etc.) and the possible beam alignment errors in the relay communication (such as the beam alignment error caused by the vibration of the antenna reflector due to the wind) can be adaptively compensated, which effectively reduces the costs associated with antenna processing, transportation, installation and maintenance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1B illustrates generally an example aperture of a feed group which is a general combining form of the MIMO multiple feeds shown in FIG. 1a.

FIG. 4a illustrates generally an example structure of a cut reflector antenna with movable MIMO multiple feeds for partial feeding, different from the MIMO multiple feeds for normal feeding shown in FIG. 1a.

FIG. 4b illustrates generally an example aperture of a feed group of the cut reflector antenna shown in FIG. 4a.

DETAILED DESCRIPTION

In order to clarify the objective, technical solutions and advantages of the present disclosure, the present disclosure will be further described in detail below with reference to the examples and drawings. The illustrative embodiments of the present disclosure and the description thereof are only adopted to explain the present disclosure but not to limit it in any way.

The detailed description is made by means of three parts, i.e., the description made in time domain, the description made in frequency domain, and the description of system operation. In the first part, i.e., the description in time domain, the wordings "time delay", "time delay compensation", "time delay compensation circuit", and "synchronous superimposing" are used to describe the relative arrival time and the time compensation of the multipath signal components for their synchronous superimposing. On contrary, in the second part, i.e., the description in frequency domain, the wordings "phase difference", "phase compensation", "phase shifter", and "in-phase superimposing" are used to describe the arrival time and time compensation of the multipath signal components for their in-phase superimposing. There is only a difference in the angle of understanding between the descriptions in time domain and in frequency domain. The basic principles of physics behind the two descriptions are same to each other.

Generally, it is convenient to describe the technical solutions in time domain in case of wideband signals or different operation frequencies for up-going channel and down-going channel, respectively; wherein the words including "phase" are difficult to understand due to the phase always varying with the frequency. On the other hand, it is convenient to describe the technical solutions in frequency domain in case of narrowband signals and same frequency used for both up-going channel and down-going channel, because any phase difference corresponds to a certain time delay for a given frequency.

Detailed Description in Time Domain

In this part, the technical solution in the disclosure is described in the time domain. The details of this solution are as follows.

A reflector antenna system with movable MIMO multiple feeds comprises a reflector antenna, equal number of duplexers with the feeds, a signal receiving module, a signal transmitting module, and a memory; wherein
    the reflector antenna comprises an antenna reflector and a plurality of feeds, wherein
    the feeds are all capable to complete duplex operations, wherein the duplex operations comprise operations in signal receiving mode and signal transmitting mode;
    the feeds are all movable to get better SNR for signals received by and transmitted from the antenna system; and main beams of the feeds always point to the antenna reflector;

the signal receiving module comprises a number of signal receiving channels, wherein each of the signal receiving channels is capable to measure the amplitude and time delay of the signals and to complete time delay compensation to the signals for final synchronous superimposing in time domain and in-phase superimposing in frequency domain of received signals output from different signal receiving channels;

the signal transmitting module comprises a number of signal transmitting channels, wherein each of the signal transmitting channels is capable to adjust the amplitude and time delay of powered signals for final synchronous superimposing in time domain and in-phase superimposing in frequency domain of wave components radiated by the feeds connected to different signal transmitting channels, achieving adaptive field focusing at receiving antenna of communication target;

each feed of the feeds is connected to one signal receiving channel of the signal receiving module and one signal transmitting channel of the signal transmitting module via a duplexer, and the signal receiving channel and signal transmitting channel connected to a same feed via a duplexer form a pair of signal receiving and transmitting channels; the duplexer guarantees electrical isolation between the signal receiving channel and the signal transmitting channel in the pair of signal receiving and transmitting channels; and the memory is used for storing data of the amplitude ratio and the time delay of the received signals measured by the signal receiving channels.

The signal receiving module comprises the equal number of signal receiving channels to the feeds, and a signal superimposing circuit; wherein the signal receiving channels have same structure and same calibrated amplitude-time delay transmission characteristics but are insulated to each other;

the signal receiving channel comprises a signal receiving circuit and a time delay compensation circuit; wherein the signal receiving circuit comprises a pre-amplifier, a filter, and a detection circuit, wherein the detection circuit is used for measuring the data of amplitude ratio and time delay of the signal output from the filter, and sending the data to the memory;

the input port of the signal receiving circuit is connected to the output port of the duplexer; the output port of the signal receiving circuit is connected to the input port of the time delay compensation circuit, the output port of the time delay compensation circuit is connected to the input port of the signal superimposing circuit;

the signal transmitting module comprises the equal number of signal transmitting channels to the feeds, a power divider, and a power signal source; wherein the signal transmitting channels have same structure and same calibrated amplitude-time delay transmission characteristics but are insulated to each other; wherein each of the signal transmitting channels comprises a gain adjustable amplifier and a time delay compensation circuit; wherein the input port of the gain adjustable amplifier is connected to the output port of the power divider connected to the powered signal resource, and the output port of the gain adjustable amplifier is connected to the input port of the time delay compensation circuit, the output port of the time delay compensation circuit is connected to the input port of the duplexer.

Each of the duplexers has an antenna port, an input port, and an output port; wherein the antenna port is connected to port of a feed of the feeds, the output port is connected to an input port of the signal receiving circuit of the signal receiving circuit, the input port is connected to an output port of the time delay compensation circuit of the signal transmitting channel; an output port of the signal receiving channel is connected to the signal superimposing circuit 230, and an input port of the signal transmitting channel is connected to the power source 340 via the power divider 330.

Figure 1A:
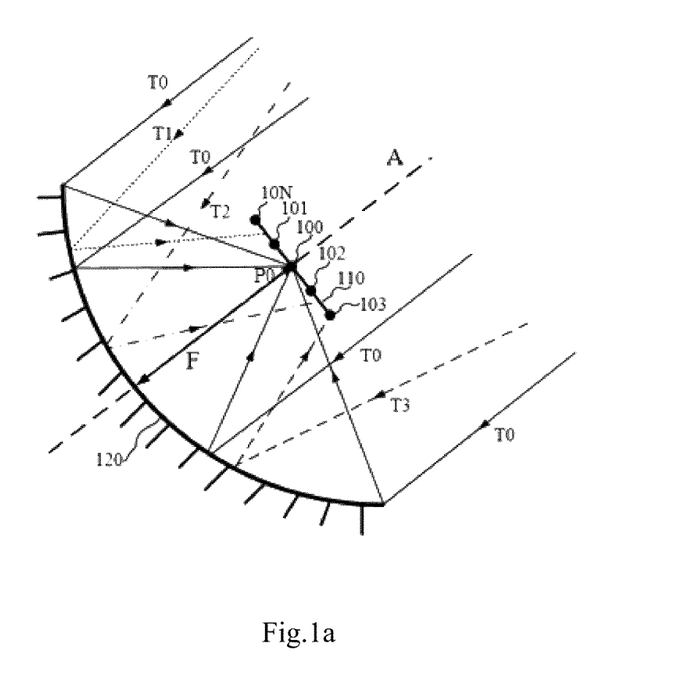
FIG. 1a illustrates generally an example structure of a reflector antenna with movable MIMO multiple feeds for normal feeding.

The multiple feeds form a feed group, the apertures of the feeds form a continuous aperture without air gap; and the continuous aperture serves as the aperture of the feed group;

the feed 100 at the center of the feed group serves as the central feed of the feed group;

for initial positions of the feed group, the phase centers of all the feeds in the feed group are located on a focal plane 110 of the reflector antenna, wherein the phase center of the central feed 100 is located at the focal point of the antenna reflector 120;

the multiple feeds are all movable from their initial positions;

the position of the feed group is adjusted on the focal plane or in the caustic region to get better SNR of the signal output from the signal receiving channel when the wave propagation media is inhomogeneous with multipath fading, leading to degradation of SNR of the receiving signal; wherein the caustic region is formed by the field points whose distance to the focal point are not exceeded to a given value;

the position adjustment of the feeds comprises the lateral two dimensions adjustment on the focal plane 110 and the longitudinal adjustment along the direction normal to the focal plane for the feed group, and three dimensions adjustment independent to each other for different feeds without limitation of configuration of the feed group, until the SNR of the signal output from the signal superimposing circuit is optimized.

For each pair of signal receiving and transmitting channels, when wireless signal transmitted from communication target arrives at the antenna and is received by the feeds, the feed corresponding to the pair of the signal receiving and transmitting channels sends the received signal to the signal receiving channel of the pair, the signal receiving circuit in the signal receiving channel amplifies and filters the signal, and the detection circuit measures the amplitude ratio and the time delay of the received signal relative to that of a reference signal, and sends the data of the amplitude ratio and the time delay to the memory for later adjusting the amplitude and the time delay of the powered signals in the signal transmitting channel of the pair;

simultaneously, the time delay compensation circuit in the signal receiving channel of the pair provides time delay compensation to signal output by each signal receiving circuit, respectively, making signals output from all the signal receiving channels synchronous;

the signals output from all the signal receiving channels are, synchronous to each other, sent to the signal superimposing circuit 230 to be superimposed synchronously to improve their SNR. If above SNR is still not as good as acceptable, the position of the feed group (or the individual feeds) can be adjusted on the focal plane or in the caustic region from their initial locations until acceptable SNR is obtained.

The power divider 330 in the signal transmitting module receives a powered signal from the power source 340 and allocates the powered signal to the signal transmitting channels;

for each pair of signal receiving and transmitting channels, the powered signal allocated to the signal transmitting channel of the pair has the amplitude adjustment via the gain adjustable amplifier and then the time delay compensation via the time delay compensation circuit, all based on the amplitude ratio and the time delay relative to that of a reference signal measured in the signal receiving channel of the pair;

the powered signals in each signal transmitting channel, after amplitude adjustment and time delay compensation, are all sent to the feeds via the input ports of the duplexers, then radiated by the feeds, reflected by the reflector 120 to the space, and finally superimposing synchronously at the antenna of communication target.

The antenna reflector 120 is a smooth metal reflector, or a reflector with metal grid or with metal wire mesh whose size is less than a preset threshold;

wherein the preset threshold means that for a waveguide with its aperture size same as the preset threshold, the cutoff frequency of the waveguide is equal to the operation frequency of the antenna for communication.

The duplexer is used for isolation between the signal receiving channel and the signal transmitting channel of a pair in case of duplex operation of each feed; the isolation between the signal receiving channel and the signal transmitting channel of each pair depends on the isolation performance of the duplexer between the input port and the output port of the duplexer. In case of separate 2 feeds for signal receiving and transmitting respectively, both the front feeding and back feeding of a dual reflector antenna with additional calibration of the path length are generally used to realize the isolation between the signal receiving channel and the signal transmitting channel of each pair.

In this example, an adaptive field focusing method through controlling the amplitude and the time delay of the powered signals to be transmitted by the antenna system is proposed, the method comprised following targets:

performing time delay compensation of received signals based on the time delay measured by the detection circuit in each signal receiving channel for synchronously superimposing of the signals output from the all signal receiving channels in the signal superimposing circuit of the signal receiving module;

adjusting the amplitude ratio and the time delay of the powered signal to be transmitted in each signal transmitting channel to the complex conjugate of the amplitude ratio and the time delay measured in the signal receiving channel of same pair for synchronously superimposing of the field components arrived at the antenna of the communication target;

and the method comprises following steps:

during a signal receiving and transmitting cycle, in the signal receiving channel of a pair, the signal receiving circuit measures the amplitude ratio and the time delay of the received signal relative to that of a reference signal firstly, and sends the data of the amplitude ratio and the time delay to the memory; meanwhile the time delay compensation circuit provides corresponding time delay compensation to received signals based on the time delay measured previously for synchronously superimposing of the signals output from the all signal receiving channels in the signal superimposing circuit; wherein the time delay compensation means compensation with the time delay same in absolute value but opposite in sign compared to the time delay measured previously;

during the same signal receiving transmitting cycle, in the signal transmitting channel of the pair, the time delay of the powered signal in the corresponding signal transmitting channel relative to that of the reference signal is adjusted to the conjugate of the time delay measured previously in the signal receiving channel of the pair; the amplitude ratio of the powered signal related to that of the reference signal is adjusted to same as the amplitude ratio measured previously in the signal receiving channel of the pair; once the amplitude and time delay adjustment are performed, the powered signal is sent to the feed connected to the pair.

The method further comprises a method of selective excitation for the feeds with the powered signals from the signal transmitting channels based on the amplitude of received signal measured by corresponding signal receiving channels;

during at least one signal receiving and transmitting cycle, in a pair of the signal receiving and transmitting channels, the signal receiving circuit detects and measures, in real time, the amplitude of the signal received by the feed connected to the pair, once the signal received by the feed is found so weak that its amplitude is lower than a threshold, the corresponding signal receiving channel will not send its output signal to the signal superimposing circuit; accordingly, the feed is no longer fed with powered signal from the power source and no longer involving the signal radiation process when the antenna is switched to the signal transmitting mode;

wherein the threshold is an amplitude value less than the maximum amplitude of the received signals by a given ratio determined in advance.

During at least one signal receiving and transmitting cycle, the amplitude ratio and time delay of the received signal are measured in the signal receiving channel of a pair, accordingly, the amplitude ratio and time delay of the powered signal in the signal transmitting channel of the pair are then adjusted based on the amplitude ratio and time delay measured previously in the signal receiving channel.

Detailed Description in Frequency Domain

In this part, the technical solution in the disclosure is described in frequency domain. The details of this solution are as follows.

A reflector antenna system with movable MIMO multiple feeds, compared with that described in time domain, wherein each duplexer of the duplexers has an antenna port, an input port, and an output port;

the antenna port is connected to the port of a feed of the feeds, the output port is connected to an input port of a signal receiving channel of the signal receiving channels, the input port is connected to an output port of a signal transmitting channel of the signal transmitting channels; an output port of the signal receiving channel is connected to the signal superimposing circuit, and an input port of the signal transmitting channel is connected to the power source via the power divider;

the signal receiving module comprises the equal number of signal receiving channels with the feeds; and a signal superimposing circuit 230; wherein the signal receiving channel comprises a signal receiving circuit, and a phase shifter; wherein the phase shifter is a device for time delay compensation in case of narrowband signals and same operation frequency for both up-going channel and down-going channel;

the signal receiving circuit comprises a pre-amplifier, a filter, a detection circuit capable to measure amplitude and phase of signals, and output data of the signal amplitude and phase;

the input port of the signal receiving circuit is connected to the output port of the duplexer, the output port of the signal receiving circuit is connected to the input port of the phase shifter, the output port of the phase shifter is connected to the input port of the signal superimposing circuit 230;

the signal receiving channels have same structure and same calibrated amplitude-phase transmission characteristics but are insulated to each other;

the signal transmitting module comprises the equal number of signal transmitting channels with the feeds; a power divider 330; and a power source 340; wherein the signal transmitting channel comprises a gain adjustable amplifier and a phase shifter;

the input port of the gain adjustable amplifier is connected to the output port of the power divider 330, and the output port of the gain adjustable amplifier is connected to the input port of the phase shifter, the output port of the phase shifter is connected the input port of the duplexer;

wherein the signal transmitting channels have same structure and same calibrated amplitude-phase transmission characteristics but are insulated to each other.

The MIMO multiple feeds form a feed group, the apertures of the feeds form a continuous aperture without air gap, and the continuous aperture serves as the aperture of the feed group;

the feed 100 at the center of the feed group serves as the central feed of the feed group;

for initial positions of the feed group, the phase centers of all the feeds in the feed group are located on a focal plane 110 of the reflector antenna, wherein the phase center of the central feed 100 is located at the focal point of the antenna reflector 120;

the central feed at the focal point works as the regular feed of the conventional reflector antenna and the other feeds of the feed group do not work when the feed group stays in its initial position and the wave propagation media is homogeneous without multipath fading;

all the feeds of the feed group work when the wave propagation media is inhomogeneous with multipath fading.

The positions of the multiple feeds or the feed group are all adjustable; and the position adjustment comprising both the lateral 2D adjustment and longitudinal adjustment;

the multiple feeds are all movable from their initial positions;

the position of the feed group is adjusted on the focal plane or in the caustic region to get better SNR of the signal output from the signal receiving channel when the wave propagation media is inhomogeneous with multipath fading, leading to degradation of SNR of the receiving signal; wherein the caustic region is formed by the field points whose distance to the focal point are not exceeded to a given value;

the position adjustment of the feeds comprises the lateral two dimensions adjustment on the focal plane and the longitudinal adjustment along the direction normal to the focal plane for the feed group, and three dimensions adjustment independent to each other for different feeds without limitation of configuration of the feed group, until the SNR of the signal output from the signal superimposing circuit is optimized.

In the signal receiving mode, wireless signals transmitted from telecommunication target and received by each feed of the feed group are sent to the signal receiving channels, respectively, and the signal receiving circuit in each signal receiving channel receives one of the wireless signals via corresponding duplexer simultaneously;

the signal receiving circuit measures the amplitude ratio and the phase difference of the received wireless signal relative to that of a reference signal, and sends the data of the amplitude ratio and the phase difference to the memory for adjusting the amplitude and the phase of the powered signals in signal transmitting mode;

the phase shifter in the signal receiving channel provides phase compensation to signal output by each signal receiving circuit, respectively, keeping signals output from all the signal receiving channels have same phase;

the signals output from all the signal receiving channels, with same phase to each other, are sent to the signal superimposing circuit 230 to be superimposed in-phase to improve their SNR. If the above SNR is still not as good as acceptable, the position of the feed group (or the individual feeds) can be adjusted on the focal plane or in the caustic region from their initial locations until acceptable SNR is obtained.

In the signal transmitting mode, the power divider 330 receives a powered signal from the power source 340 and allocates the powered signal to each signal transmitting channel;

the powered signal allocated to each signal transmitting channel has the amplitude adjustment via the gain adjustable amplifier and then the phase compensation via the phase shifter, all based on the amplitude ratio and the phase difference relative to that of a reference signal measured in the signal receiving mode;

the powered signals in each signal transmitting channel, after amplitude adjustment and phase compensation, are all sent to the feeds via the input ports of the duplexers, then radiated by the feeds, reflected by the reflector 120 and transmitted finally to the space, respectively.

The antenna reflector 120 is a smooth metal reflector, or a reflector with metal grid or with metal wire mesh whose size is less than a preset threshold;

wherein the preset threshold means that for a waveguide with its aperture size same as the preset threshold, the cutoff frequency of the waveguide is equal to the operation frequency of the antenna for communication.

The isolation between the signal receiving channel and the signal transmitting channel can be realized by using the duplexer, or using both the front feeding and back feeding of a dual reflector antenna with corresponding calibration of the path length.

An adaptive field focusing method through adjusting the amplitude and the phase of the powered signals to be transmitted by the antenna system, comprises following targets:

performing phase compensation of received signals in different signal receiving channels for in-phase superimposing of the signals in the signal receiving module;

adjusting the amplitude ratio and the phase difference of the powered signal to be transmitted in each signal transmitting channel to the complex conjugate of the amplitude ratio and the phase difference measured in the signal receiving channel of same pair;

and the method comprises following steps:

during a signal receiving and transmitting cycle, in the signal receiving channel of a pair, the signal receiving circuit measures the amplitude ratio and the phase difference of the received signal relative to that of a reference signal firstly, and sends the data of the amplitude ratio and the phase difference to the memory; meanwhile the phase compensation circuit provides corresponding phase compensation to received signals based on the phase difference measured previously for in-phase superimposing of the signals output from the all signal receiving channels in the signal superimposing circuit of the signal receiving module, wherein the phase compensation is compensation with the phase difference same in absolute value and opposite in sign compared to the phase difference measured previously;

during the same signal receiving and transmitting cycle, in the signal transmitting channel of the pair, the phase difference of the powered signal in the corresponding signal transmitting channel relative to that of the reference signal is adjusted to the conjugate of the phase difference measured previously in the signal receiving channel of the pair; the amplitude ratio of the powered signal related to that of the reference signal is adjusted to same as the amplitude ratio measured previously in the signal receiving channel of the pair; once the amplitude and phase adjustment are performed, the powered signal is sent to the feed connected to the pair;

reference signals used to determine the amplitude ratio and the phase difference in the signal receiving channel and in the signal transmitting channel of the pair can be completely different to each other.

During at least one signal receiving and transmitting cycle, the amplitude and phase of the powered signal in the signal transmitting channel are adjusted based on the data of the amplitude ratio and phase difference of the received signal measured in the signal receiving mode.

Detailed Description of System Operation

The reflector antenna system with movable MIMO multiple feeds comprises an antenna reflector, a plurality of feeds, the same number of duplexers as the feeds, a signal receiving module with the same number of the signal receiving channels (SRCl) as the feeds, a signal superimposing circuit, a signal transmitting module with the same number of the signal transmitting channels (STCl) as the feeds, a power divider, and a power signal source (PSS), and corresponding method of adjusting the amplitude and time delay of signals; wherein all the signal receiving channels are capable to measure the amplitude and the time delay of signals and to do compensation of the time delay of signals, and all the signal transmitting channels are capable to adjust the amplitude and the time delay of signals;

As the original condition, the multiple feeds form a feed group, which means the apertures of the feeds form a continuous aperture without air gap; and the continuous aperture serves as the aperture of the feed group;

the feed 100 at the center of the feed group serves as the central feed of the feed group;

as the initial positions of the feed group, the phase centers of all the feeds in the feed group are located on a focal plane 110 of the reflector antenna, wherein the phase center of the central feed 100 is located at the focal point of the antenna reflector 120, as shown in FIG. 1;

main beams of the different feeds in the feed group always point to the antenna reflector, even in process of the feeds' position adjusting.

The multiple feeds are all movable from their initial positions; and the position adjustment of the feeds comprises the lateral adjustment in the orthogonal two dimensions on the focal plane 100 and the longitudinal adjustment along the direction normal to the focal plane for the feed group, and three dimensions adjustment independent to each other for different feeds without limitation of configuration of the feed group, until the SNR of the signal output from the signal superimposing circuit is optimized;

the position of the feed group is adjusted on the focal plane or in the caustic region to get better SNR of the signal output from the signal receiving channel when the wave propagation media is inhomogeneous with multipath fading effect, leading to degradation of SNR of the receiving signal; wherein the caustic region is formed by the field points whose distance to the focal point are not exceeded to a given value.

As mentioned above, in their initial positions, the phase centers of all the feeds in the feed group locate on the focal plane of the antenna reflector, wherein the phase center of the central feed (the feed locates at the central position of the feed group) is located at the focal point of the reflector, and the phase centers of the other feeds are located on the focal plane 110 of the reflector. The initial position of the feed group corresponds to the situation of a uniform wireless channel. That is, when the wave propagation space is uniform medium and there is no multipath fading effect, the feed group is located in its initial position, and the central feed located at the focal point corresponds to the feed of the conventional reflector antenna. However, when there is inhomogeneity and multipath fading in the wave propagation space, the different feeds of the feed group may receive the signals with different SNR in signal receiving mode of the antenna although its main beam still points to the communication target. In this situation the SNR of the received signal can be improved by adjusting the position of the feed group, or adjusting the positions of the feeds in the feed group independently within the caustic area.

Figure 2:
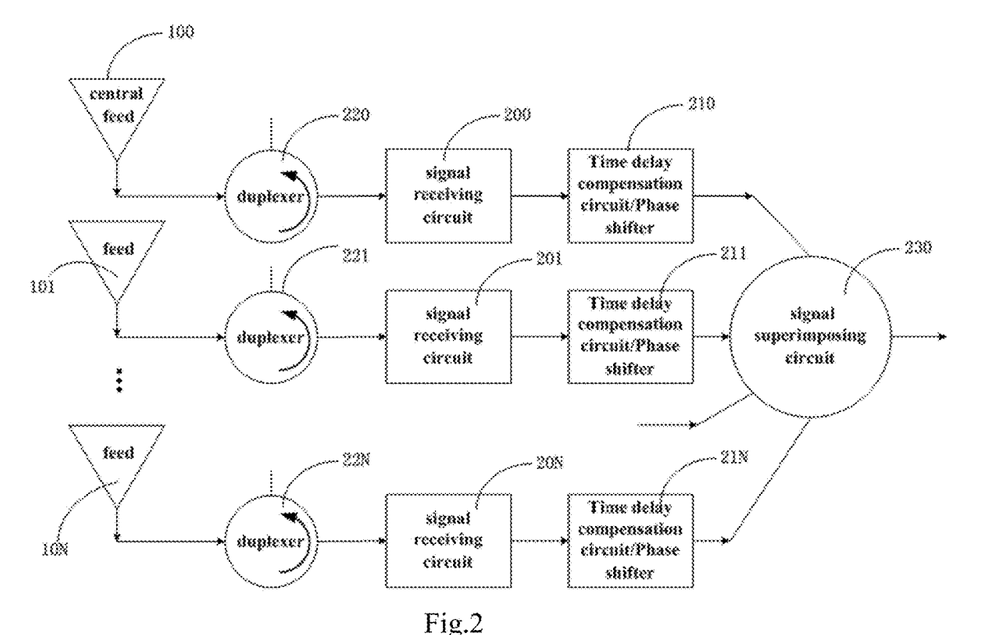
FIG. 2 illustrates generally a block diagram of an example signal receiving module of the reflector antenna system with N+1 feeds shown in FIG. 1a. The input port of the signal receiving channel is connected to the output port of the corresponding duplexer.
Figure 3:
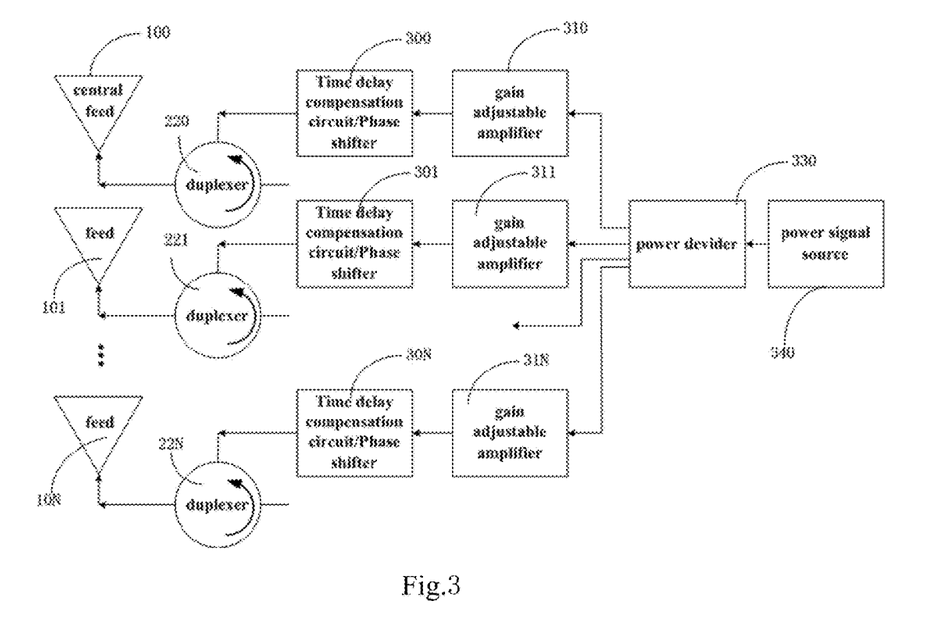
FIG. 3 illustrates generally a block diagram of an example signal transmitting module of the reflector antenna system with N+1 feeds shown in FIG. 1a. The output port of each signal transmitting channel is connected to the input port of the corresponding duplexer.

FIG. 2 illustrates generally a block diagram of an example signal receiving module with N+1 signal receiving channels (SRCls) which are connected to N+1 feeds (100, 101, 102, 103, 104, 105, . . . , 10N) via N+1 duplexers, respectively. Each duplexer has three ports, i.e., the antenna port, the output port, and the input port, where the antenna port is connected to the feed, the output port is connected to the input port of corresponding SRCl, and the input port is connected to the output port of corresponding STCl. The output port of the SRCl is connected the signal superimposing circuit, and the input port of the STCl is connected to the power source via the power divider, as shown in FIG. 2 and FIG. 3, where the directions of the arrows in the figures represent the directions of the signal flowing.

As mentioned above, each feed of the feeds is connected to one signal receiving channel of the signal receiving module and one signal transmitting channel of the signal transmitting module via a duplexer; the signal receiving channel and the signal transmitting channel connected to a same feed via a duplexer form a pair of signal receiving and transmitting channels; the duplexer guarantees electrical isolation between the signal receiving channel and the signal transmitting channel in the pair of signal receiving and transmitting channels;

For each of N+1 signal receiving channels (SRCl), first channel for example, includes a signal receiving circuit (SRC) 200 among signal receiving circuits 200, 201, . . . , 20N and a time delay compensation circuit 210 among the time delay compensation circuits 210, 211, . . . , 21N; the input port of the SRC is connected to the output port of the duplexer, the output port of the SRC is connected to the input port of the time delay compensation circuit, the output port of the time delay compensation circuit is connected to the input port of the signal superimposing circuit. The SRC includes a preamplifier, a filter, and a detection circuit connected in sequence, wherein the detection circuit is capable of measuring the data of amplitude ratio and time delay of the signal output by the filter and outputting the data to the memory. The different SRCls have the same structure and same calibrated amplitude-time delay transmission characteristics but are insulated to each other.

In the signal receiving mode, the wireless signals transmitted from the communication target and received by different feeds in the feed group are sent to the SRC via the duplexer, the SRC measures the amplitude ratio (AR) and the time delay (TD) to a reference signal, and stores the data of AR and TD to the memory for later adjusting the amplitude and time delay of the powered signals in the signal transmission channel of same pair.

The time delay compensation circuit completes the time delay compensation for the received signals according to the measured data of AR and TD mentioned above, making the signals output from each SRCl are same in time delay to each other and superimposed synchronously by the signal superimposing circuit to improve the SNR of the received signals.

FIG. 3 illustrates generally a block diagram of an example signal transmitting channel of the reflector antenna system with movable MIMO multiple feeds same as that illustrated in FIG. 2, where the power signals from the power source 340 are sent to each STCl via the power divider 330, as shown in FIG. 3. Each STCl includes a gain adjustable amplifier (GAA), and a time delay compensation circuit. In each STCl, the input port of the GAA is connected to the output port of the power divider, the output port of the GAA is connected to the input port of the time delay compensation circuit, and the output port of the time delay compensation circuit is connected to the input port of the duplexer. The different STCls are the same in their structures but independent in operation (i.e., without mutual coupling) to each other. The output port of the signal transmitting channel (STCl) is connected to the input port of the corresponding duplexer, and the antenna port of the duplexer is connected to the input port of the corresponding feed.

The signal receiving channel (SRCl) and the signal transmitting channel (STCl) both connected to a same feed via a duplexer form a pair of signal receiving and transmitting channels; The time delay measurement and corresponding compensation in SRCl and adjusting of the amplitude ratio and time delay based on the measured data in STCl are complemented always within a same pair of the SRCl and STCl.

In the signal transmitting mode, the power signal from the power source 340 is divided to multiple power signal components by the power divider 330, and the power signal components are sent to the input ports of every STCl, respectively. Then the power signal component in each STCl, the first STCl, for example, is adjusted in amplitude by the gain adjustable amplifier 310 among gain adjustable amplifiers 310, 311, . . . , 31N, and in time delay by the time delay compensation circuit 300 among the time delay compensation circuits 300, 301, . . . , 30N, based on the data of AR and TD measured previously in the signal receiving channel of same pair. Afterwards, the power signal components are sent to the corresponding feeds via the duplexers, radiated by the feeds, and finally reflected by the reflector to space as one of wave components.

When the wave propagation media are homogeneous (free space, for example), only the central feed located at the focal point will receive signal with maximum amplitude, and the other feeds in their initial locations receive no signals with available amplitude while the antenna beam points to the communication target in the signal receiving mode. Meanwhile, SNR of the output of SRCls connected to the other feeds less than a given value, those SRCls no longer works and no longer provides its output to signal superimposing circuit. In this case the operation of the antenna is the same as the fixed beam mode of the regular reflector antenna with a single feed.

When the propagation media are no longer homogeneous, i.e., there is obvious inhomogeneity and multipath fading effect in the wave propagation environment, the wave arrives at the antenna through not only a straight path but also some possible paths with their different arriving angles. In this situation, besides the central feed located at the focal point receives wireless signal with much worse SNR, the other feeds in their initial locations also receive some signals with different intensity and different time delay although the antenna beam still points to the communication target in signal receiving mode. The amplitude and the time delay of the signals received by different feeds depend not only on the real-time inhomogeneity of the propagation media, but also on the position adjustment of the feeds. The signal components received by different feeds, with pre-amplifying, filtering, time delay detecting and time delay compensation in success, are finally superimposed synchronously in time domain (or in-phase in frequency domain) by the signal superimposing circuit.

In the signal transmitting mode, the power signal components to be radiated from the power source 340 are sent synchronously to every STCl, respectively, via the power divider. The power signal component input to every STCl has the amplitude adjusting and time delay compensation according to the corresponding AR and TD data measured previously in the signal receiving channel of the signal receiving and transmitting pair, i.e. making its AR and TD relative to a reference signal equal to the AR and the conjugate of the TD measured in the signal receiving channel of the pair, respectively, wherein the conjugate of the TD corresponds the negative of the TD in time domain, i.e. the conjugate of the time delay means the time advance with same quantity. After the amplitude adjusting and time delay compensation, the power signal component is sent to corresponding feed via the duplexer, radiated by the feed, and finally reflected from the antenna reflector, resulting in a space wave component. According to the reciprocity theorem of electromagnetics, the different space wave components radiated from all the STCls will be superimposed synchronously at the antenna of the communication target. Actually, the key information about the inhomogeneous wireless channel and its multipath effect is included in the data of the AR and TD measured in the signal receiving channels although the detail of the inhomogeneity model is not known in real time, and the transmitting signal and the receiving signal at this moment share a same wireless channel. Therefore the wave components radiated from all the STCls are superimposed synchronously at the antenna of the communication target, achieving the field focusing adaptively.

In extreme situation for fast variation of the space inhomogeneity, during at least one receiving and transmitting cycle, when the SRCl receives a pilot signal from the communication target, its signal receiving circuit measures the AR and TD, and sends those data to the memory for later amplitude and time delay adjusting of the powered signal component in STCl of same pair. Meanwhile, the signal output from SRCl, having the time delay compensation, is then sent to the signal superimposing circuit for superimposing synchronously. Considering one receiving and transmitting cycle is so short in time domain that the space inhomogeneity is varied little, the data dependence for the AR and TD between a pair of the signal receiving and transmitting channels is available.

However, in common situations for ordinary variation of the space inhomogeneity, the AR and TD measuring in SRCl and the AR and TD adjusting in STCl don't have to be complemented in every receiving and transmitting cycle because the variation of the multipath fading figure is not really so fast. For example, if AR and TD is invariant during a couple of the receiving and transmitting cycles, the AR and TD adjusting in STCl may not be updated until obvious variation of AR and TD measured in SRCl is observed. The period (i.e., the number of the cycles) without renewed AR and TD adjusting depends on the stability of inhomogeneity figure of given wireless channel (propagation media) in given time.

Further, in the signal receiving mode, when the feed of each signal receiving channel receives the wireless signal emitted by the communication target, the signal receiving circuit will measure the amplitude of the received signal in real time. When the received signal in a SRCl is so weak that its amplitude ratio (AR) to a given reference signal is lower than a preset AR threshold, the output signal from this SRCl is no longer sent to the signal superimposing circuit. When the antenna is switched to the signal transmitting mode, accordingly, the power signal from the corresponding STCl is no longer sent to the relevant feed. In other words, the feed no longer radiates the signal. The preset AR threshold refers to a measure for the amplitude ratio of a weak signal to the most intensive signal (i.e., with the maximum amplitude) among the all signals received by the SRCls.

Further, the position adjustment of the different feeds in the feed group includes the lateral position adjustment of the feed group within the focal plane, the longitudinal position adjustment of the feed group in direction normal to the focal plane, and the position adjustment of the different feeds independent to each other within the caustic region. The aforementioned position adjustment ends once the SNR of the signal output from the signal superimposing circuit shows its best or acceptable value in the position adjusting process. The area of the position adjusting, depending on the application situation and engineering experience, is not limited in this disclosure.

Further, the antenna reflector is metal reflector, or reflector made of metal meshes of metal grid with their aperture size not larger than a given size threshold, wherein the given size threshold means that the cut-off frequency of a waveguide is equal to the operation frequency of the reflector antenna provided the aperture size of the waveguide is equal to the given size threshold mentioned above.

To ensure the condition of the reciprocity theorem and realization of the adaptive field focusing, the amplitude and the time delay characteristics should be carefully calibrated to their uniformity both for different SRCls and for different STCls. As a method popular in relevant engineering society, the calibration may be conducted by means of injecting the standard signals with the uniform amplitudes and uniform time delay to the channels, and adjusting the transmission functions of the channels until the output signals show their uniformity both in their amplitude and in their time delay. The relevant adjusting data should be stored in system control software as the system initial data. The standard signals may be a uniform plane wave incident normal to the aperture of the feed group in its initial location for the calibration of the SRCls, and a given stable signal output from the power source for the calibration of the STCls.

Additional Notes

The following should be notified in detail.

The reflector antenna with movable MIMO multiple feeds and corresponding amplitude-time delay adjusting method proposed in this disclosure are suitable for wireless environment with multipath fading effect in both millimeter wave wireless communication and microwave wireless communication.

For the reflector antenna with movable MIMO multiple feeds proposed in this disclosure, the different feeds in the feed group may be, but not limited to, different kinds of the waveguide with open aperture, horn, corrugated horn, microstrip antenna, and helical antenna, etc.

Figure 4A:
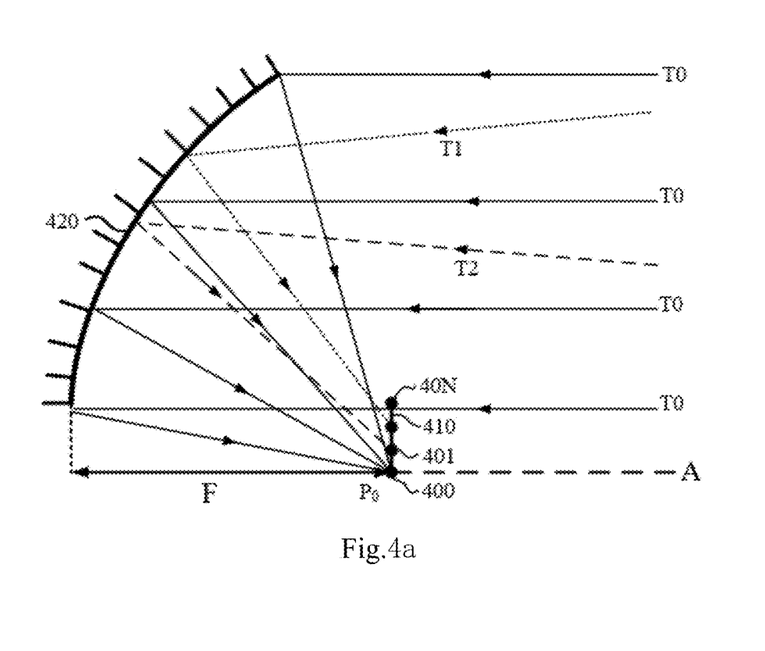
Figure 4B:
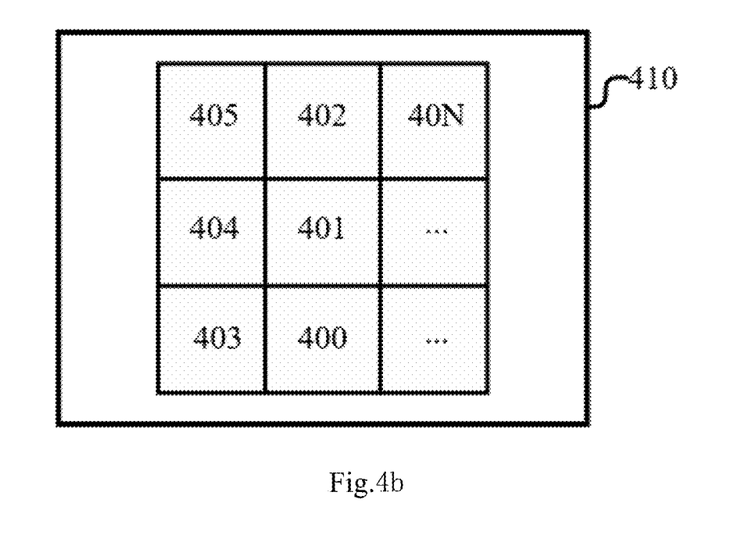

For the reflector antenna with movable MIMO multiple feeds proposed in this disclosure, the modality of wave illuminating to the reflector includes, but not limited to, the normal space feeding and the partial space feeding (illuminating to a cut reflector). In the former (normal space feeding) case, the feed group may result in relatively more sheltering against the radiation wave, and in the later (partial space feeding) case the feed group result in less sheltering. Generally, the partial space feeding with the cut reflector may be reasonable due to the smaller sheltering area resulted from the feed group. FIG. 4a illustrates generally an example structure of a reflector antenna with the cut reflector and the partial feeding from the movable MIMO multiple feeds, where the antenna reflector is a cut reflector 420, the phase centers of the feeds 400,401, 402, 403, 404, 405, . . . , 40N are located on the focal plane 410, and the phase center of the central feed 400 is located at the focal point P0. FIG. 4b illustrates generally an example structure of an aperture of a feed group. The apertures of all the feeds in the feed group form a continuous aperture without any air gap, i.e., the aperture of a feed group, as shown in FIG. 4b. Obviously, the partial feeding of the feed group reduces their shelter from the reflected rays remarkably.

The moving mode of the feed group mentioned in this disclosure may be, but not limited to, the overall displacement of the feed group within the focal plane, the individual displacement of some feeds in the feed group, or the position adjusting of all the feeds in the feed group independent to each other. Generally, the former (i.e., the overall displacement of the feed group within the focal plane) is the simplest and enough in most cases.

The reflector antenna with movable MIMO multiple feeds proposed in this disclosure, wherein the reflector comprises, but not limited to, different types of the dual reflector antenna and the modified dual reflector antenna, where the initial locations of the feeds' phase centers are within the first focal plane and the second focal plane, respectively.

Example Embodiments

As shown in FIGS. 1a-4b, the present embodiment provides an example of a reflector antenna system with movable MIMO multiple feeds suitable for transmission environment with multipath fading effect, comprising:

a parabolic antenna reflector 120 with a focal length F; a plurality of feeds which are all capable to complete duplex operations, i.e., operations of signal receiving and signal transmitting; the feeds are all movable to get better SNR for signals received by and transmitted from the antenna system; and the main beams of the feeds always point to the antenna reflector 120;

a feed group formed with all the feeds, the aperture of the feed group is a continuous aperture without any air gap;

the equal number of duplexers to the feeds; the signal receiving module with the equal number of the signal receiving channels to the feeds; the signal transmitting module with the equal number of the signal transmitting channels to the feeds; a signal superimposing circuit 230, a power divider 330 and a power signal source 340;

At the initial position of the feed group, the central feed 100 located at the center point of the feed group is set on the focus point P0 of the antenna reflector 120, and the other feeds 101, 102, 103, 104, 105, . . . 10N are set on the focal plane 110; In FIG. 1*a*, T0 represents an incoming wave components in the direction of the main path (i.e. the direction of the main beam of the antenna), which are focused at the focal point P0 and received by the central feed 100 after being reflected by the antenna reflector 120; T1, T2 and T3 represent the incoming wave components in the direction of other paths, which do not focus at the focal point P0 but have strong field distribution at some other field points in the focal plane or caustic area after being reflected by the antenna reflector 120; wherein the caustic area refers to an area composed of all field points whose distances to the focus point are less than a preset value. These fields will be received by other feeds 101, 102, 103, 104, 105, . . . 10N through their location adjusting within the focal plane or the caustic area. Therefore, like the central feed 100, the feeds 101, 102, 103, 104, 105, . . . 10N also have strong received signal components with the same frequency and polarization but different time delay. The position of each feed located in the caustic area may be fine-tuned by means of a rotation-translation conversion device, such as a screw that turns rotation into translation, until the amplitude and SNR of the signal output from the signal superimposing circuit reaches a relative maximum. Upon determination of the position of each feed, the signal strength and time delay of the feed only depend on the real-time non-uniformity and multi-path transmission characteristics of the wireless transmission channel. In FIG. 1*a*, A represents the rotation axis of the antenna reflector 120.

Figure 1B:
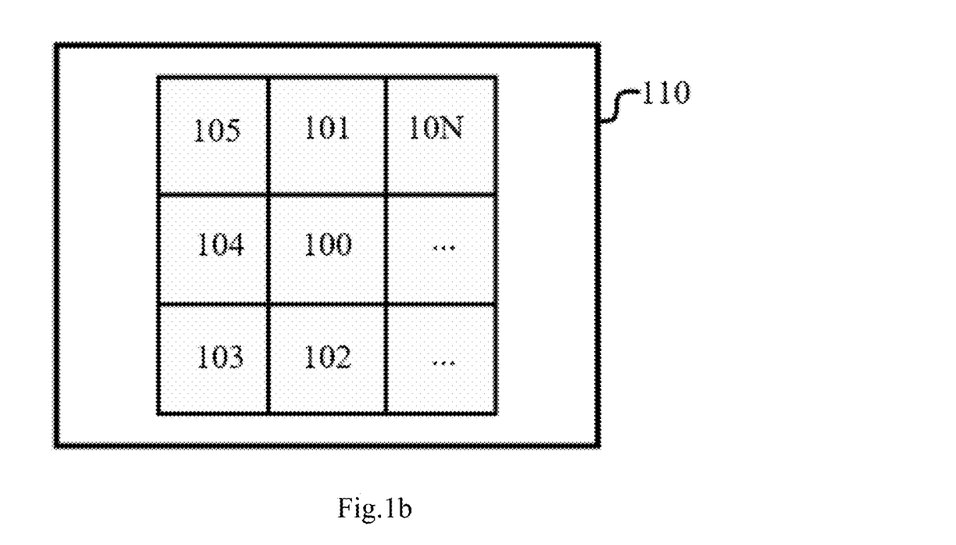

The feeds in this embodiment are open-ended rectangular waveguides, and the entire radiation aperture of the feed group is therefore coplanar and continuous. FIG. 1*b* is a schematic diagram of radiation aperture of N+1 feeds of open-ended rectangular waveguide set on focal plane 110. In the present disclosure, the feeds applied in the feed group can be, but not limited to, open-ended waveguide, dielectric loaded waveguide, horn antenna, microstrip antenna, and spiral antenna.

Each feed is correspondingly connected to a duplexer, and the output port of the duplexer is connected to the signal receiving channel (SRCl), while the input port thereof is connected to the signal transmitting channel (STCl). The output port of the SRCl is connected to the signal superimposing circuit 230, and the input port of the STCl is connected to the power signal source 340 via the power divider 330. The directions of the arrows in FIGS. 1-4 represent the directions of the signals flow.

Specifically, the output port of the duplexer is connected to the signal receiving channel (SRCl) and the input port thereof is connected to the signal transmitting channel (STCl). The isolation between the input port and output port of the duplexer ensures the isolation between the signal receiving channel (SRCl) and the signal transmitting channel (STCl).

The specific signal flow for signal receiving mode (SRM) is shown in FIG. 2. The feeds 100, 101, 103, 104, 105, . . . 10N in the feed group receive respectively the wireless signal emitted by a communication object, and then, through the corresponding duplexers 220, 221 . . . 22N, the received signals output from different feeds are sent to the signal receiving circuit for noise suppression (filtering), time delay detection, and measurement, output and storage of the amplitude ratio and time delay with respect to the reference signal in succession. The signal receiving circuit sends the signal to the time delay compensation circuit connected there to, and the time delay compensation circuit provides time delay compensation for the received signal based on the measured time delay to obtain synchronous signals output from different signal receiving channels. Then the synchronous signals are superimposed synchronously by the signal superimposing circuit 230.

The signal receiving circuit (SRCt) consists of a preamplifier, a filter, a time delay detector and a circuit for amplitude and time delay measurement.

Specifically, after the signal receiving circuit pre-amplifies and filters a received signal, the time delay detector measures the amplitude ratio and time delay of the received signal relative to the reference signal in real time. When the amplitude of the receiving signal is not lower than the preset amplitude threshold, for example, −20 db relative to the maximum received signal amplitude, the received signal is compensated in time delay by a time delay compensation circuit, so that the received signals output from the different signal receiving channels (SRCl) are synchronous to each other in the frequency domain or synchronized in the time domain, and the synchronous signals obtained through compensation are sent to the signal superimposing circuit 230 to achieve the in-phase or synchronous superposition to improve SNR of the receiving signal. The signal superimposing circuit 230 in the present embodiment is an adder.

In FIG. 2, when the feed of each signal receiving channel (SRCl) receives the wireless signal emitted by the communication object, the signal receiving circuit (SRCt) will measure the amplitude of the signal received by each feed in real time. When the signal received by one of the feeds 101, 102, 103, 104, 105, . . . 10N located in the focal plane or caustic region is so weak that its amplitude is lower than a preset amplitude threshold, the signal receiving channel (SRCl) where the feed is located will no longer transmit the output signal to the synchronous superposition circuit. Accordingly, when the antenna is switched to the signal transmitting mode, the feed whose amplitude of the received signal is lower than the threshold mentioned above is no longer fed by the power source, i.e., no longer involves in the signal radiation process.

The specific signal flow for signal transmitting mode (STM) is shown in FIG. 3. In the signal transmitting mode (STM), the power divider 330 distributes the power signals coming from the power source 340 to each signal transmitting channel (STCl). The power signal assigned to each signal transmitting channel (STCl) is adjusted in amplitude by an adjustable gain amplifier and in time delay by the time delay compensation circuit. According to the conjugate of the amplitude ratio and time delay of the received signal measured by the signal receiving circuit in the signal receiving mode, the amplitude adjustment and time delay compensation of the power signal are realized by using the adjustable gain amplifier and the time delay compensation circuit in the signal transmitting circuit, respectively.

The power signal in each signal transmitting channel (STCl), after being subjected to amplitude adjustment and time delay compensation, is fed to corresponding feed in the feed group of the reflector antenna through the input terminal of the duplexer, and finally transmitted to the space by the radiation of the feed and the reflection of the antenna reflector 120.

To make it easier to understand, the following example is given for illustration and explanation. It is assumed that the main beams of millimeter-wave communication antennas of two adjacent base stations have been aligned to each other (i.e., the geometric alignment of the main beams under condition of the uniform atmospheric channel, in dry and clear night sky, for example) and the normal signal receiving and transmitting operations can be performed. At this time, the plane wave radiated by the transmitter is reflected by the parabolic reflector of the receiver, forming a focusing field at the focal point of the antenna reflector, which is received by the central feed located at the focal point. With the scorching sun directly overhead, the temperature rises rapidly during the day, and the water in rivers, lakes, or ponds in the transmission path of the wireless relay evaporates, forming water vapor masses in the wireless communication channel. Due to the refraction of the electromagnetic waves by the water vapor mass, the arrival direction of some components of the wireless signal is no longer consistent with the main beam direction of the receiving antenna, forming an angle $\theta$ to the main beam. When the multipath transmission effect occurs in the wireless communication channel, the multiple components of the incident wave can be observed. The incoming wave component which direction of arriving (DOA) is consistent with that of the main beam of the antenna, corresponding to case of $\theta=0$, will focus on the focal point of the parabolic reflector and be received by the central feed 100. Taking the level of the signal received by the central feed as the reference level, the incoming wave component with its DOA not consistent with the main beam direction of the receiving antenna, corresponding to the case of $\theta$ not equal to 0, will form focal spots deviating from the focal point on the focal plane or in the caustic region, wherein the larger the $\theta$ angle is, the greater the deviation of the focal spot from the focal point is. Multiple focal spots may be observed simultaneously on the focal plane when the atmospheric inhomogeneity leads to strong multipath transmission effects.

In the situation mentioned above, the signal quality received by the central feed located at the focal point will be significantly degraded. Then, the open-ended waveguide feed group shown in FIG. 1*b* is moved laterally, that is, the position of the feed group is fine-tuned in two lateral dimensions in the focal plane, so that several focal spots with relative larger field strength fall in the apertures of different feeds. At this time, the antenna receives the strongest signal, and the feed assembly will no longer move. The signal received by the feed is then sent to the signal receiving channel (SRCl) and the amplitude ratio and time delay of the received signal relative to the given reference signal are both measured by the SRCl and then output to the memory. According to the time delay between the received signal and the reference signal, the time delay compensation circuit in the SRCl compensates the time delay of the received signal, leading the time delay of the signals output from each SRCl are same to each other. And then the signals with same time delay are all sent to the signal superimposing circuit for synchronous superposition to improve SNR of the received signal.

In the above process, instead of moving the parabolic reflector by any mechanical means to pursue the geometric alignment between the transmitting beam and the receiving beam in the multipath transmission environment, the lateral position of the feed group is fine-tuned so that the aperture of each feed is adjusted to include the main focal spots on the focal plane, thus making the received signal components superimpose synchronously, maximizing the amplitude thereof, and therefore optimizing the SNR of the superimposed signal components. With the adjusted position of the feed group in the signal receiving mode unchanged, the amplitude ratio and time delay of the power signal of each signal transmitting channel relative to the reference signal is adjusted, in the signal transmitting mode, to the complex conjugate with respect to the data of the amplitude ratio and time delay measured in the signal receiving mode. After that, the power signals are transmitted to the space through each feed and reflector, so as to achieve the self-focusing of each radiation component at the antenna of the communication object quickly and adaptively, and thus to achieve the optimal wireless transmission in the multipath transmission environment.

The specific embodiments described above further detail the purpose, technical solutions and beneficial effects of the present disclosure. It should be understood that the above description is only a specific embodiment of the present disclosure, and is not intended to limit the scope of protection of the present disclosure. Any modification, equivalent replacement, improvement, etc. made within the spirit and principles of the present disclosure shall be included in the scope of protection of the present disclosure.

What is claimed is:

1. A reflector antenna system with movable Multiple-Input and Multiple-Output (MIMO) multiple feeds, comprising a reflector antenna, a signal receiving module, a signal transmitting module, N+1 duplexers, and a memory; wherein N is an integer not less than 1, wherein the reflector antenna comprises an antenna reflector and a MIMO feed group including N+1 feeds, wherein
the N+1 feeds are all capable to complete signal receiving and signal transmitting operations;
the N+1 feeds are all movable to get better Signal to Noise Ratio (SNR) for signals received by and transmitted from the reflector antenna system; and
main beams of the N+1 feeds always point to the antenna reflector;

the signal receiving module comprises N+1 signal receiving channels, and the signal transmitting module comprises N+1 signal transmitting channels, wherein each of the N+1 signal receiving channels and each of the N+1 signal transmitting channels are corresponding to one feed of the N+1 feeds, each of the N+1 signal receiving channels is configured to receive a signal from the one feed of the N+1 feeds and measure an amplitude and a time delay of the signal and to complete time delay compensation to the signal for final synchronous superimposing in time domain and in-phase superimposing in frequency domain;

each of the N+1 signal transmitting channels is configured to adjust an amplitude and a time delay of a power signal and send the power signal to the one feed of the N+1 feeds for final synchronous superimposing in time domain and in-phase superimposing in frequency domain for wave components radiated by the N+1 feeds connected to different signal transmitting channels and achieving adaptive field focusing at a receiving antenna of a communication target;

the N+1 duplexers construct respectively N+1 connection correspondences same to each other, wherein each one of the N+1 duplexers connects one of the N+1 feeds to one of the N+1 signal receiving channels and one of the N+1 signal transmitting channels forming the N+1 connection correspondences same to each other, in a given connection correspondence, a signal receiving channel and a signal transmitting channel share a same feed, and form a pair of the signal receiving channel and the signal transmitting channel; as a result, there are N+1 pairs of the signal receiving channel and the signal transmitting channel in the reflector antenna system, each pair of the signal receiving channel and the signal transmitting channel corresponds a given feed and a given duplexer; and the memory is used for storing data of amplitude ratios and time delays of received signals measured by each signal receiving channel and sending the data to a corresponding signal transmitting channel of the pair of the signal receiving channel and the signal transmitting channel.

2. The reflector antenna system of claim 1, wherein the signal receiving module further comprises a signal superimposing circuit; wherein the N+1 signal receiving channels have same structure and same calibrated amplitude-time delay transmission characteristics but are isolated to each other;

each of the N+1 signal receiving channels comprises a signal receiving circuit and a time delay compensation circuit; wherein the signal receiving circuit comprises an amplifier, a filter, and a detection circuit, wherein the detection circuit is used for measuring data of an amplitude ratio and a time delay of a signal output from the filter, and sending the data of the amplitude ratio and the time delay of the signal output from the filter to the memory;

an input port of the signal receiving circuit is connected to a duplexer; an output port of the signal receiving circuit is connected to an input port of the time delay compensation circuit, an output port of the time delay compensation circuit is connected to an input port of the signal superimposing circuit;

the signal transmitting module further comprises a power divider, and a power signal source; wherein the N+1 signal transmitting channels have same structure and same calibrated amplitude-time delay transmission characteristics but are isolated to each other; wherein each of the N+1 signal transmitting channels comprises a gain adjustable amplifier and a time delay compensation circuit; wherein an input port of the gain adjustable amplifier is connected to an output port of the power divider connected to the power signal source, and an output port of the gain adjustable amplifier is connected to an input port of the time delay compensation circuit, an output port of the time delay compensation circuit is connected to the duplexer.

3. The reflector antenna system of claim 2, wherein each of the N+1 duplexers has an antenna port, an input port, and an output port; wherein in each connection correspondence of the N+1 connection correspondences, the antenna port of the duplexer is connected to the given feed, the output port of the duplexer is connected to the input port of the signal receiving circuit of the signal receiving channel, the input port of the duplexer is connected to the output port of the time delay compensation circuit of the signal transmitting channel; an output port of the signal receiving channel is connected to the signal superimposing circuit, and an input port of the signal transmitting channel is connected to the power signal source via the power divider.

4. The reflector antenna system of claim 2, wherein for each pair of the signal receiving channel and the signal transmitting channel, when wireless signal transmitted from the communication target arrives at the reflector antenna and is received by a feed corresponding to the pair of the signal receiving channel and the signal transmitting channel, the feed sends the signal to the signal receiving channel of the pair of the signal receiving channel and the signal transmitting channel, the signal receiving circuit in the signal receiving channel amplifies and filters the signal, and the detection circuit measures the amplitude ratio and the time delay of the signal relative to that of a reference signal, and sends the data of the amplitude ratio and the time delay to the memory for later adjusting an amplitude and a time delay of the power signal in the signal transmitting channel of a same pair of the signal receiving channel and the signal transmitting channel;

simultaneously, the time delay compensation circuit in the signal receiving channel of the pair of the signal receiving channel and the signal transmitting channel provides time delay compensation to signal output from the signal receiving circuit, making signals output from all the N+1 signal receiving channels synchronous;

the signals output from all the N+1 signal receiving channels are, synchronous to each other, sent to the signal superimposing circuit to be superimposed synchronously to improve their SNR.

5. The reflector antenna system of claim 2, wherein the power divider in the signal transmitting module is configured to receive the power signal from the power signal source, and to allocate the power signal to the signal transmitting channels;

for each pair of the signal receiving channel and the signal transmitting channel, the signal transmitting channel receives the power signal and conducts an amplitude adjustment via the gain adjustable amplifier and then a time delay compensation via the time delay compensation circuit, all based on an amplitude ratio and a time delay measured by the signal receiving channel in a same pair of the signal receiving channel and the signal transmitting channel and stored by the memory;

power signals in the signal transmitting channels, after amplitude adjustments and time delay compensations, are all sent to corresponding feeds separately via antenna ports of corresponding duplexers, and then reflected to space, and finally superimposed synchronously at the receiving antenna of the communication target.

6. The reflector antenna system of claim 1, wherein
all feeds of the MIMO feed group in their initial positions form a continuous aperture without air gap; and the continuous aperture serves as an aperture of the MIMO feed group;
a feed of the N+1 feeds at a center of the MIMO feed group serves as a central feed of the MIMO feed group;
phase centers of all feeds in the MIMO feed group are located on a focal plane of the reflector antenna, wherein a phase center of the central feed is located at a focal point of the antenna reflector;
all feeds of the MIMO feed group are movable from their initial positions;
a position of the MIMO feed group is adjusted on the focal plane of the reflector antenna or in a caustic region of the reflector antenna to get better SNR of signals output from the N+1 signal receiving channels when a wave propagation medium is inhomogeneous with multipath fading, leading to degradation of SNR of receiving signals; wherein the caustic region is formed by all field points whose distance to the focal point of the antenna reflector are not exceeded to a given value;
a position adjustment comprises a lateral two dimensional adjustment on the focal plane of the antenna reflector and a longitudinal adjustment along a direction normal to the focal plane of the antenna reflector for the MIMO feed group, and a three dimensional adjustment independent to each other for different feeds without limitation of configuration of the MIMO feed group, until a SNR of a signal output from the signal superimposing circuit is optimized.

7. The reflector antenna system of claim 1, wherein
the antenna reflector is a smooth metal reflector, or a reflector with metal grid or with metal wire mesh whose size is less than a preset threshold;
wherein the preset threshold means that for a waveguide with its aperture size same as the preset threshold, a cutoff frequency of the waveguide is equal to an operation frequency of the reflector antenna.

8. The reflector antenna system of claim 1, wherein each duplexer of the N+1 duplexers is used for isolation between the signal receiving channel and the signal transmitting channel of a same pair of the signal receiving channel and the signal transmitting channel; the isolation between the signal receiving channel and the signal transmitting channel of each pair of the signal receiving channel and the signal transmitting channel depends on a duplexer performance of isolation between an input port and an output port of the duplexer.

9. An adaptive field focusing method through adjusting the amplitude and the time delay of the power signal to be transmitted by the reflector antenna system in claim 1, comprising:
performing time delay compensations on the received signals in different signal receiving channels respectively, and synchronously superimposing the received signals after time delay compensations in the signal receiving module;
adjusting amplitude ratios and time delays of power signals to be transmitted in each signal transmitting channel to complex conjugate of the amplitude ratios and the time delays measured in the signal receiving channel of a same pair of the signal receiving channel and the signal transmitting channel;
wherein,
during a signal receiving and transmitting cycle, in the signal receiving channel of the pair of the signal receiving channel and the signal transmitting channel, the amplitude and the time delay of a received signal relative to that of a reference signal are measured firstly, and then sent to the memory; meanwhile the time delay compensation is performed to the received signals based on a time delay measured previously for synchronously superimposing of the signals output from the N+1 signal receiving channels; wherein the time delay compensation is performed based on a time delay data same in absolute value and opposite in sign compared to the time delay measured previously;
during the signal receiving and transmitting cycle, in the signal transmitting channel of the pair of the signal receiving channel and the signal transmitting channel, the time delay of the power signal relative to that of a reference signal is adjusted to a conjugate of the time delay measured previously in the signal receiving channel of the pair of the signal receiving channel and the signal transmitting channel; an amplitude ratio of the power signal related to that of the reference signal is adjusted to same as an amplitude ratio measured previously in the signal receiving channel of the pair of the signal receiving channel and the signal transmitting channel; once the amplitude and time delay adjustment are performed, the power signal is sent to a feed connected to the pair of the signal receiving channel and the signal transmitting channel, wherein the conjugate of the time delay is defined as a time delay same in absolute value and opposite in sign;
reference signals used to determine the amplitude ratios and the time delays in the signal receiving channels and amplitude ratios and time delays in the signal transmitting channels can be completely different to each other.

10. The adaptive field focusing method of claim 9, wherein
the adaptive field focusing method further comprises a method of selective excitation to the N+1 feeds with the power signals from corresponding signal transmitting channels based on amplitudes measured by corresponding signal receiving channels during at least one signal receiving and transmitting cycle;
during the at least one signal receiving and transmitting cycle, in the pair of the signal receiving channel and the signal transmitting channel, the signal receiving circuit detects and measures, in real time, an amplitude of a signal received by a corresponding feed of the N+1 feeds, once the signal received by the feed is found so weak that its amplitude is lower than a threshold, the corresponding signal receiving channel will not send its output signal for signal superimposing; accordingly, the feed is no longer fed with the power signal and no longer involving a signal radiation process;
wherein the threshold is an amplitude value less than the maximum amplitude of the received signals by a given ratio determined in advance.

11. The adaptive field focusing method of claim 9, wherein
during at least one signal receiving and transmitting cycle, the amplitude ratio and time delay of the received signal are measured in the signal receiving channel of the pair of the signal receiving channel and the signal transmitting channel, accordingly, the amplitude ratio and time delay of the power signal in the signal transmitting channel of the same pair of the signal receiving channel and the signal transmitting channel are then adjusted based on the amplitude ratio and the time delay measured previously in the signal receiving channel.

12. The reflector antenna system of claim 1, wherein
each duplexer of the N+1 duplexers has an antenna port, an input port, and an output port;
the antenna port is connected to a port of a corresponding feed of the movable MIMO multiple feeds, the output port is connected to an input port of a corresponding signal receiving channel of the N+1 signal receiving channels, the input port is connected to an output port of a corresponding signal transmitting channel of the N+1 signal transmitting channels; an output port of the signal receiving channel is connected to a signal superimposing circuit, and an input port of the signal transmitting channel is connected to a power signal source via a power divider;
the signal receiving module further comprises the signal superimposing circuit;
the signal receiving channel comprises a signal receiving circuit, and a phase shifter; wherein
the phase shifter is a device for time delay compensation in case of narrowband signals;
the signal receiving circuit comprises a pre-amplifier, a filter, and a detection circuit capable to measure amplitude and phase of signals, and send data of the signal amplitude and phase to the memory;
an input port of the signal receiving circuit is connected to the output port of the each duplexer, an output port of the signal receiving circuit is connected to an input port of the phase shifter, an output port of the phase shifter is connected to an input port of the signal superimposing circuit;
wherein the N+1 signal receiving channels have same structure and same calibrated amplitude-phase transmission characteristics but are isolated to each other;
the signal transmitting module further comprises the power divider; and the power signal source; wherein
the signal transmitting channel comprises a gain adjustable amplifier and a phase shifter;
an input port of the gain adjustable amplifier is connected to an output port of the power divider, and an output port of the gain adjustable amplifier is connected to the input port of the phase shifter, the output port of the phase shifter is connected the input port of the each duplexer;
wherein the N+1 signal transmitting channels have same structure and same calibrated amplitude-phase transmission characteristics but are isolated to each other.

13. The reflector antenna system of claim 12, wherein
the movable MIMO multiple feeds in their initial positions form a feed group, apertures of the N+1 feeds form a continuous aperture without air gap, and the continuous aperture serves as an aperture of the feed group;
a feed at a center of the feed group serves as a central feed of the feed group;
phase centers of all the N+1 feeds in the feed group are located on a focal plane of the reflector antenna, wherein a phase center of the central feed is located at a focal point of the antenna reflector;
the central feed at the focal point works as a regular feed of a conventional reflector antenna and other feeds of the feed group do not work when a wave propagation media is homogeneous without multipath fading;
all the N+1 feeds of the feed group work when the wave propagation media is inhomogeneous with multipath fading.

14. The reflector antenna system of claim 13, wherein
positions of the N+1 feeds in the feed group are all adjustable; and a position adjustment comprises both a lateral two dimensional (2D) adjustment and a longitudinal adjustment;
the N+1 feeds are all movable from their initial positions;
a position of the feed group is adjusted on a focal plane or in a caustic region to get better SNR of a signal output from a corresponding signal receiving channel when the wave propagation media is inhomogeneous with multipath fading, leading to degradation of SNR of a received signal; wherein the caustic region is formed by field points whose distance to the focal point are not exceeded to a given value;
the position adjustment of the N+1 feeds comprises the lateral 2D adjustment on the focal plane and the longitudinal adjustment along a direction normal to the focal plane for the feed group, and a three dimensions adjustment independent to each other for different feeds without limitation of configuration of the feed group, until a SNR of a signal output from the signal superimposing circuit is optimized.

15. The reflector antenna system of claim 12, wherein
in a signal receiving mode of a signal receiving and transmitting cycle, wireless signals transmitted from telecommunication target and received by each feed of the feed group are sent to the signal receiving channels, respectively, and each one of signal receiving circuits in the signal receiving channels receives the wireless signals via corresponding duplexer simultaneously;
the signal receiving circuit measures an amplitude ratio and a phase difference of the received wireless signal relative to that of a reference signal, and sends data of the amplitude ratio and the phase difference to the memory for adjusting amplitude and phase of the power signal in the corresponding signal transmitting channel of the N+1 signal transmitting channels;
the phase shifter in the signal receiving channel provides phase compensation to signal output by each signal receiving circuit, respectively, keeping signals output from all the N+1 signal receiving channels have same phase;
the signals output from all the N+1 signal receiving channels, with same phase to each other, are sent to the signal superimposing circuit to be superimposed in-phase to improve their SNR.

16. The reflector antenna system of claim 12, wherein
the antenna reflector is a smooth metal reflector, or a reflector with metal grid or with metal wire mesh whose size is less than a preset threshold;
wherein the preset threshold means that for a waveguide with its aperture size same as the preset threshold, a cutoff frequency of the waveguide is equal to an operation frequency of the reflector antenna for communication.

17. The reflector antenna system of claim 12, wherein
an isolation between the signal receiving channel and the signal transmitting channel can be realized by using the duplexer.

\* \* \* \* \*